United States Patent
Nishikawa et al.

(10) Patent No.: US 9,087,660 B2
(45) Date of Patent: Jul. 21, 2015

(54) SWITCH MECHANISM AND ELECTRONIC DEVICE

(71) Applicant: NINTENDO CO., LTD., Kyoto (JP)

(72) Inventors: Munetaka Nishikawa, Kyoto (JP); Kumpei Fujita, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 140 days.

(21) Appl. No.: 13/930,098

(22) Filed: Jun. 28, 2013

(65) Prior Publication Data

US 2014/0014485 A1   Jan. 16, 2014

(30) Foreign Application Priority Data

Jul. 13, 2012   (JP) ............................. 2012-157432

(51) Int. Cl.
  H01H 13/14 (2006.01)
  G06F 1/16 (2006.01)

(52) U.S. Cl.
  CPC ............. H01H 13/14 (2013.01); G06F 1/1616 (2013.01); G06F 1/1671 (2013.01)

(58) Field of Classification Search
  CPC ...... H01H 13/14; G06F 1/1616; G06F 1/1671
  USPC ................. 200/345, 293, 61.1, 339, 341, 5 A
  See application file for complete search history.

(56) References Cited

U.S. PATENT DOCUMENTS

| | | | |
|---|---|---|---|
| 7,625,286 B2 * | 12/2009 | Hamada | 463/37 |
| 8,309,870 B2 * | 11/2012 | Peterson et al. | 200/344 |
| 8,847,890 B2 * | 9/2014 | Peterson et al. | 345/168 |
| 2005/0247550 A1 | 11/2005 | Hamada | |

FOREIGN PATENT DOCUMENTS

| | | |
|---|---|---|
| JP | 4-42029 | 4/1992 |
| JP | 2007-525795 | 9/2007 |

* cited by examiner

*Primary Examiner* — Edwin A. Leon
(74) *Attorney, Agent, or Firm* — Nixon & Vanderhye P.C.

(57) ABSTRACT

An exemplary embodiment provides a switch mechanism of which key top portion can be tilted with a simple mechanism. The switch mechanism includes a housing portion, a key top portion arranged such that a partial surface thereof is exposed at a peripheral portion of the housing portion, and a switch portion which is arranged in the inside of the housing portion and can be pressed in response to pressing of the partial surface of the key top portion. The housing portion includes a side support portion which tilts the key top portion by supporting the key top portion from a side when the partial surface of the key top portion is pressed.

18 Claims, 11 Drawing Sheets

SWITCH MECHANISM AND ELECTRONIC DEVICE

This nonprovisional application is based on Japanese Patent Application No. 2012-157432 filed on Jul. 13, 2012 with the Japan Patent Office, the entire contents of which are hereby incorporated by reference.

FIELD

The technology herein relates to a switch mechanism and an electronic device, and particularly to a switch mechanism including a key top portion arranged in a housing portion and an electronic device including the same.

BACKGROUND AND SUMMARY

Some of portable electronic devices, controllers, and the like have conventionally been provided with a switch mechanism at an end portion such as a shoulder portion of a housing.

Exemplary embodiments provide a switch mechanism of which key top portion can be tilted with a simple mechanism and an electronic device including the same.

An exemplary embodiment provides a switch mechanism including a housing portion, a key top portion arranged such that a partial surface is exposed at a peripheral portion of the housing portion, and a switch portion which is arranged in the inside of the housing portion and can be pressed in response to pressing of the partial surface of the key top portion. The housing portion includes a side support portion which tilts the key top portion by supporting the key top portion from a side when the partial surface of the key top portion is pressed.

According to the exemplary embodiment, when the partial surface of the key top portion is pressed, the side support portion supports the key top portion from the side. When the partial surface exposed at the peripheral portion of the housing portion is pressed, the key top portion is obliquely pressed, and hence force pressing the key top portion acts not only in the direction of pressing the key top portion but also on the side of the key top portion. Therefore, with support of the key top portion from the side by the side support portion, the key top portion can be tilted while it is supported by the side support portion. Therefore, a switch mechanism of which key top portion can be tilted with a simple mechanism without using a pin can be implemented.

In an exemplary embodiment, the housing portion is constructed such that the key top portion is tilted while a position where the side support portion and the key top portion are in contact with each other is varied when the partial surface of the key top portion is pressed. Therefore, when the partial surface of the key top portion is pressed, the key top portion can be tilted while a position where the side support portion and the key top portion are in contact with each other is varied. Thus, the key top portion can smoothly be tilted.

In an exemplary embodiment, the housing portion further includes a contact portion for supporting the key top portion from a direction of pressing of the key top portion when the partial surface of the key top portion is pressed. Therefore, when the partial surface of the key top portion is pressed, the contact portion can support the key top portion from the direction of pressing of the key top portion. Accordingly, displacement of the key top portion in the direction opposite to the direction of pressing can be suppressed by the contact portion. Thus, the key top portion can be tilted in a stable manner.

In an exemplary embodiment, the housing portion is constructed such that the key top portion is tilted while a position where the contact portion and the key top portion are in contact with each other is varied when the partial surface of the key top portion is pressed. Therefore, when the partial surface of the key top portion is pressed, the key top portion can be tilted while a position where the contact portion and the key top portion are in contact with each other is varied. Thus, the key top portion can smoothly be tilted.

In an exemplary embodiment, the housing portion further includes a support portion for supporting the key top portion from a direction opposite to a direction of pressing the key top portion when the partial surface of the key top portion is pressed. Therefore, when the partial surface of the key top portion is pressed, the key top portion can be supported by the support portion from the direction opposite to the direction of pressing the key top portion. Thus, the key top portion can smoothly be tilted.

In an exemplary embodiment, the key top portion further includes an engagement portion formed to protrude sideward from the key top portion and a cover portion forming a part of the partial surface of the key top portion. The key top portion is constructed to be supported by the side support portion between the engagement portion and the cover portion. Therefore, since the side support portion lies between the engagement portion and the cover portion, falling off of the key top portion from the housing portion can be suppressed. In addition, since the cover portion can cover the side support portion, exposure of the side support portion can be suppressed.

In an exemplary embodiment, the switch portion is arranged to be pressed by the key top portion as the key top portion is tilted while the key top portion is supported by both of the side support portion and the contact portion when the partial surface of the key top portion is pressed. Thus, as the key top portion is tilted while it is supported by both of the side support portion and the contact portion, the switch portion can be pressed in.

In an exemplary embodiment, a biasing portion which is arranged between the key top portion and the switch portion and capable of biasing the key top portion in a direction opposite to the direction of pressing is further provided. A biasing member can bias the key top portion in the direction opposite to the direction of pressing. Thus, the biasing portion can return the key top portion to a position before pressing.

In an exemplary embodiment, a falling-off prevention portion provided in the key top portion is further included, and the falling-off prevention portion is locked to the housing portion. Therefore, the falling-off prevention portion can prevent the key top portion from falling off from the housing portion.

An exemplary embodiment provides an electronic device including the switch mechanism described above. Thus, an electronic device including the switch mechanism of which key top portion can be tilted with a simple mechanism can be obtained.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Exemplary embodiments will be described hereinafter with reference to the drawings.

Initially, a construction of a game device in an exemplary embodiment will be described. In exemplary embodiments, a case where a switch mechanism is applied to a game device will be described by way of example.

Figure 1:
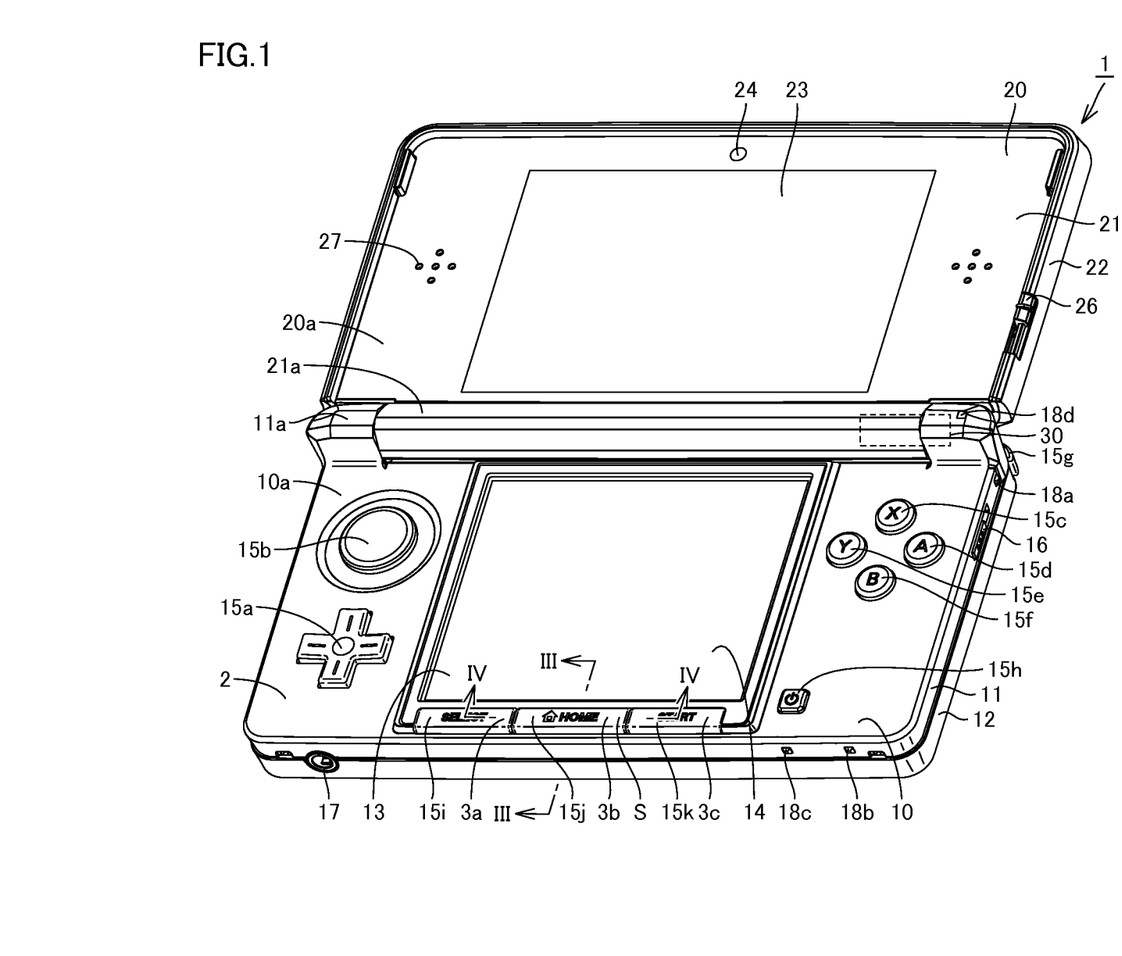
FIG. 1 shows an exemplary illustrative non-limiting schematic perspective view showing an open state of a game device according to an exemplary embodiment.
Figure 2:
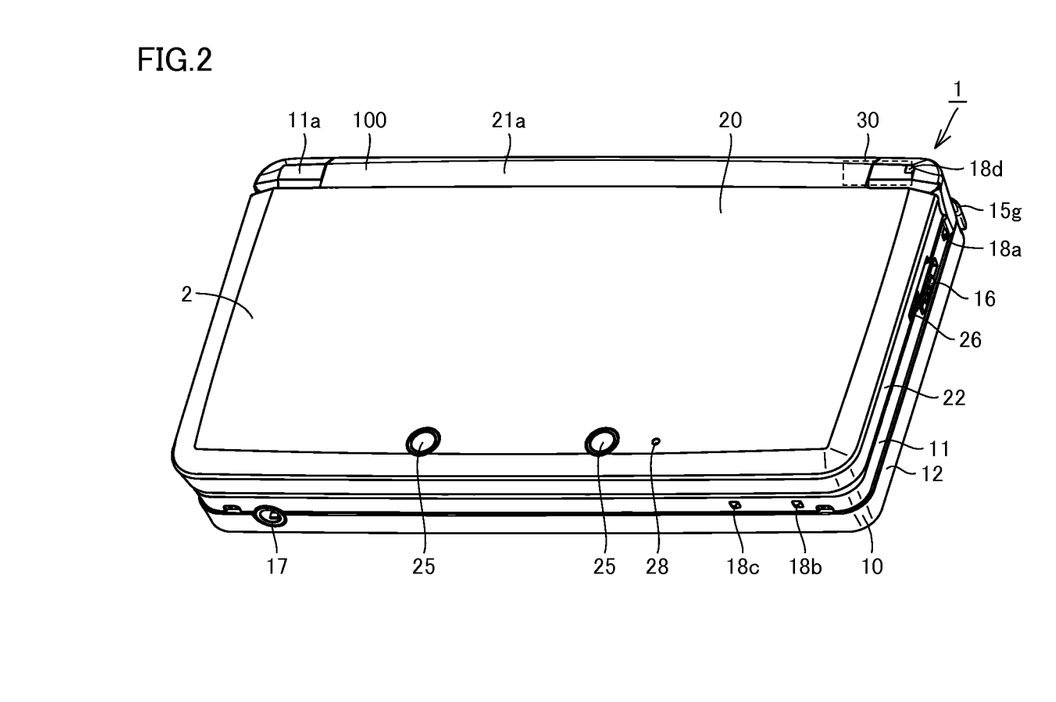
FIG. 2 shows an exemplary illustrative non-limiting schematic perspective view showing a closed state of the game device according to an exemplary embodiment.

Referring to FIGS. 1 and 2, a game device 1 is a portable game device. Game device 1 is constructed to be foldable. Game device 1 mainly has a housing portion 2 and a hinge structure 30. Housing portion 2 has a lower housing 10 and an upper housing 20. Lower housing 10 and upper housing 20 are connected to each other by means of hinge structure 30 to allow opening and closing (be foldable).

Game device 1 is constructed to be able to be in an opened state (an open state) shown in FIG. 1 and a closed state (a closed state) shown in FIG. 2 as lower housing 10 and upper housing 20 are opened and closed by means of hinge structure 30. A main surface 10a of lower housing 10 and a main surface 20a of upper housing 20 are located on an outer side in the open state and not located on the outer side in the closed state.

Lower housing 10 mainly has a lower front part 11, a lower rear part 12, a lower LCD (Liquid Crystal Display) 13, a touch panel 14, a cross key 15a, an analog key 15b, operation buttons 15c to 15g, a power button 15h, a SELECT button 15i, a HOME button 15j, a START button 15k, a wireless switch 16, an earphone jack 17, and LEDs 18a to 18d (Light Emitting Diodes).

Lower front part 11 forms main surface 10a and a front side surface of lower housing 10. Lower rear part 12 forms a back surface and a rear side surface of lower housing 10. On main surface 10a of lower housing 10, lower LCD 13, touch panel 14, cross key 15a, analog key 15b, operation buttons 15c to 15f, power button 15h, SELECT button 15i, HOME button 15j, and START button 15k are arranged. Wireless switch 16 and LED 18a are arranged on a right side surface of lower housing 10, earphone jack 17 and LEDs 18b, 18c are arranged on a front surface thereof, and an R button 15g is arranged at a right shoulder portion of the back surface. In addition, though not shown, an L button is arranged at a position corresponding to the R button, at a left shoulder portion of the back surface. It is noted that LED 18d is arranged in a lower protrusion portion 11a of lower housing 10 which will be described later.

In addition, lower housing 10 has a game card unit, an SD card unit, a touch pen holder, a power supply connector, a cradle connection terminal, a sound volume switch, and the like, which are not shown. The game card unit, the SD card unit, the touch pen holder, the power supply connector, and the cradle connection terminal are arranged in the back surface of lower housing 10, and the sound volume switch is arranged on a left side surface thereof. In addition, lower housing 10 contains a wireless communication module, a microphone, a battery, an information processing unit, and the like therein, which are not shown.

Upper housing 20 mainly has an upper front part 21, an upper rear part 22, an upper LCD 23, an inner image pick-up portion 24, an outer image pick-up portion 25, a parallax amount adjustment switch 26, a sound emission hole 27, and an LED 28. Upper front part 21 forms main surface 20a of upper housing 20. Upper rear part 22 forms a back surface and a side surface of upper housing 20.

Upper LCD 23, inner image pick-up portion 24, and sound emission hole 27 are arranged on main surface 20a of upper housing 20. Two outer image pick-up portions 25 and LED 28 are arranged on the back surface of upper housing 20. Parallax amount adjustment switch 26 is arranged at a corner portion of main surface 20a and a right side surface of upper housing 20. In addition, upper housing 20 contains a not-shown speaker and the like therein.

Lower housing 10 has lower protrusion portion 11a at each of opposing end portions of an upper longer side portion, which protrudes in a direction perpendicular to main surface 10a of lower housing 10. Lower protrusion portion 11a is provided in lower front part 11 so as to protrude in a direction opposite to lower rear part 12. Upper housing 20 has an upper protrusion portion 21a in a portion except for the opposing end portions of the lower longer side portion, which protrudes from a lower surface of upper housing 20 in a direction perpendicular to the lower surface. Upper protrusion portion 21a is provided to extend along main surface 20a of upper housing 20.

As lower protrusion portion 11a of lower housing 10 and upper protrusion portion 21a of upper housing 20 are coupled to each other by means of hinge structure 30, lower housing 10 and upper housing 20 are connected to each other to be foldable.

A construction of the switch mechanism of game device 1 will now be described in further detail. Referring again to FIG. 1, SELECT button 15i has a key top portion 3a, HOME button 15j has a key top portion 3b, and START button 15k has a key top portion 3c. Key top portions 3a to 3c are arranged such that a partial surface S is exposed at a peripheral portion of lower front part 11 of housing portion 2.

Figure 3:
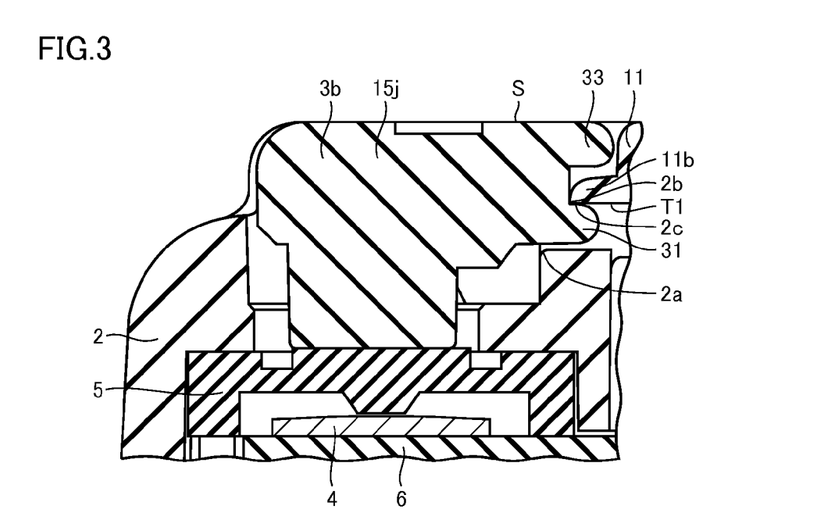
FIG. 3 shows an exemplary illustrative non-limiting schematic cross-sectional view showing a portion around a switch mechanism along the line III-III in FIG. 1 according to an exemplary embodiment.

In succession, HOME button 15j will be described with reference to FIGS. 3 to 5. Though HOME button 15j is mainly described for the sake of convenience of illustration, SELECT button 15i and START button 15k are also similarly constructed unless otherwise specified. FIG. 3 is a schematic cross-sectional view showing a portion around the switch mechanism along the line in FIG. 1. Namely, it is a figure of the portion around the switch mechanism in the cross-sectional view in a direction of a shorter side of lower housing 10. A switch portion 4 is arranged under key top portion 3b of HOME button 15j. Switch portion 4 is arranged in the inside of housing portion 2. Switch portion 4 is constructed such that it can be pressed in response to pressing of partial surface S of key top portion 3b.

Key rubber (a biasing portion) 5 is arranged between key top portion 3b and switch portion 4. Key rubber (biasing portion) 5 is constructed to be able to bias key top portion 3b in a direction opposite to the direction of pressing. Key rubber (biasing portion) 5 is formed of rubber which is an elastic body, and it is constructed to be able to bias key top portion 3b with elastic force of rubber.

Housing portion 2 has a support portion 2a, a side support portion 2b, and a contact portion 2c. Support portion 2a is constructed to support key top portion 3b from a direction opposite to the direction of pressing key top portion 3b when partial surface S of key top portion 3b is pressed. Support portion 2a is in a bent shape.

More specifically, lower front part 11 of lower housing 10 forming housing portion 2 has a restriction member 11b. Restriction member 11b is formed to protrude toward a side surface of key top portion 3b. Restriction member 11b is in a bent shape from an upper surface to a lower surface. Side support portion 2b and contact portion 2c are provided in restriction member 11b. Side support portion 2b is provided at a side surface of restriction member 11b having a bent shape. Contact portion 2c is provided at a lower surface of restriction member 11b.

In a case where key top portion 3b is arranged at a peripheral portion of housing portion 2, even if an operator intends to press key top portion 3b from above, force in a lateral direction is applied and hence that force in the lateral direction should be supported. In HOME button 15j as well, when partial surface S of key top portion 3b is pressed, not only vertical pressing force but also horizontal pressing force are applied to key top portion 3b. Side support portion 2b is constructed to support the side surface of key top portion 3b to which horizontal pressing force is applied when partial surface S of key top portion 3b is pressed.

Side support portion 2b is constructed to tilt key top portion 3b by supporting key top portion 3b from a side in a direction intersecting the direction of pressing key top portion 3b when partial surface S of key top portion 3b is pressed. Side support portion 2b is constructed to support key top portion 3b from the direction intersecting the direction of pressing key top portion 3b. Side support portion 2b is constructed to restrict displacement of key top portion 3b toward restriction member 11b.

Then, housing portion 2 is constructed such that key top portion 3b is tilted while a position where side support portion 2b and key top portion 3b are in contact with each other is varied when partial surface S of key top portion 3b is pressed.

Contact portion 2c is constructed to support key top portion 3b from the direction of pressing down key top portion 3b when partial surface S of key top portion 3b is pressed. Contact portion 2c is constructed to be able to restrict displacement of key top portion 3b in the direction opposite to the direction of pressing when partial surface S of key top portion 3b is pressed.

Then, housing portion 2 is constructed such that key top portion 3b is tilted while a position where contact portion 2c and key top portion 3b are in contact with each other is varied when partial surface S of key top portion 3b is pressed.

In addition, switch portion 4 is arranged such that it is pressed by key top portion 3b as key top portion 3b is tilted while it is supported by both of side support portion 2b and contact portion 2c when partial surface S of key top portion 3b is pressed.

Each of key top portions 3a to 3c of respective SELECT button 15i, HOME button 15j, and START button 15k has an engagement portion 31, a falling-off prevention portion 32, and a cover portion 33. Engagement portion 31 is formed to protrude sideward in each of key top portions 3a to 3c. Engagement portion 31 is formed such that its tip end is in an arc shape in a cross-sectional view. Engagement portion 31 has a linear portion extending straight between the tip end and a root. Engagement portion 31 is arranged closer to partial surface S of key top portion 3b than support portion 2a. Side support portion 2b and contact portion 2c are arranged closer to partial surface S of key top portion 3b than engagement portion 31.

Figure 4:
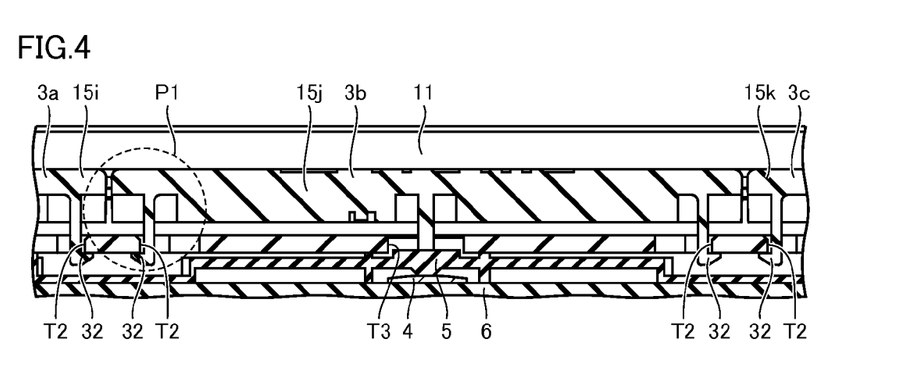
FIG. 4 shows an exemplary illustrative non-limiting schematic cross-sectional view showing a portion around the switch mechanism along the line IV-IV in FIG. 1 according to an exemplary embodiment.
Figure 5:
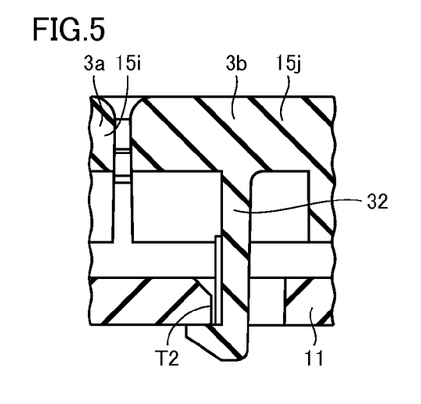
FIG. 5 shows an exemplary illustrative non-limiting enlarged view showing a P1 portion in FIG. 4 according to an exemplary embodiment.

Referring mainly to FIGS. 4 and 5, falling-off prevention portion 32 is formed to protrude downward in each of key top portions 3a to 3c. Falling-off prevention portion 32 is formed to have a tip end in a claw shape. Falling-off prevention portion 32 is locked to lower front part 11 of housing portion 2.

Referring mainly to FIG. 3, cover portion 33 forms a part of partial surface S of key top portion 3b. A side surface portion having a planar shape is provided between engagement portion 31 and cover portion 33. Restriction member 11b lies between engagement portion 31 and cover portion 33. Key top portion 3b is constructed to be supported by side support portion 2b between engagement portion 31 and cover portion 33.

Figure 6:
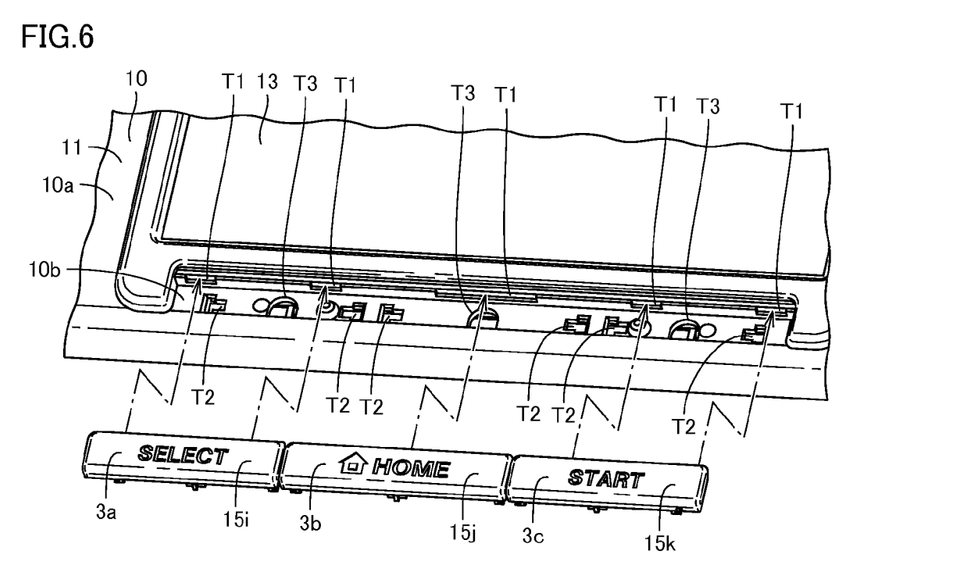
FIG. 6 shows an exemplary illustrative non-limiting schematic exploded perspective view of a SELECT button, a HOME button, and a START button according to an exemplary embodiment.

Referring to FIG. 6, lower front part 11 has a first locking hole T1, a second locking hole T2, and an insertion hole T3. Referring to FIGS. 3 and 6, first locking hole T1 is formed to open such that engagement portion 31 can be inserted therein. Referring to FIGS. 4 to 6, second locking hole T2 is formed such that falling-off prevention portion 32 can be inserted therein. Referring to FIGS. 4 and 6, insertion hole T3 is constructed such that a lower end of each of key top portions 3a to 3c can be inserted therethrough.

Figure 7:
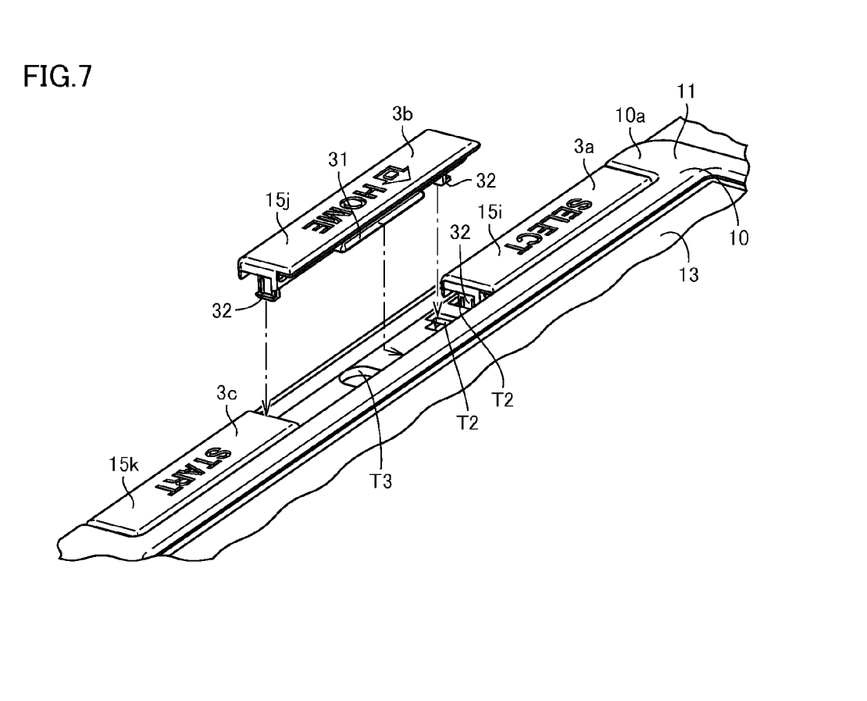
FIG. 7 shows an exemplary illustrative non-limiting schematic exploded perspective view of the HOME button according to an exemplary embodiment.

Referring to FIGS. 6 and 7, key top portion 3a of SELECT button 15i, key top portion 3b of HOME button 15j, and key top portion 3c of START button 15k are arranged at an end portion of main surface 10a of lower housing 10. The switch mechanism is arranged in a part of the peripheral portion of housing portion 2. A locking groove 10b is formed at an end portion of lower front part 11. Key top portion 3a of SELECT button 15i, key top portion 3b of HOME button 15j, and key top portion 3c of START button 15k are inserted as aligned in locking groove 10b.

First locking hole T1, second locking hole T2, and insertion hole T3 are formed in an inner peripheral surface of locking groove 10b. First locking hole T1 is formed in a side surface of locking groove 10b on a side of lower LCD 13. Second locking hole T2 and insertion hole T3 are formed in a bottom surface of locking groove 10b. Engagement portion 31 of each of SELECT button 15i, HOME button 15j, and START button 15k is inserted in first locking hole T1 and falling-off prevention portion 32 is inserted in and locked to second locking hole T2, so that key top portions 3a to 3c are locked to lower front part 11.

Figure 8:
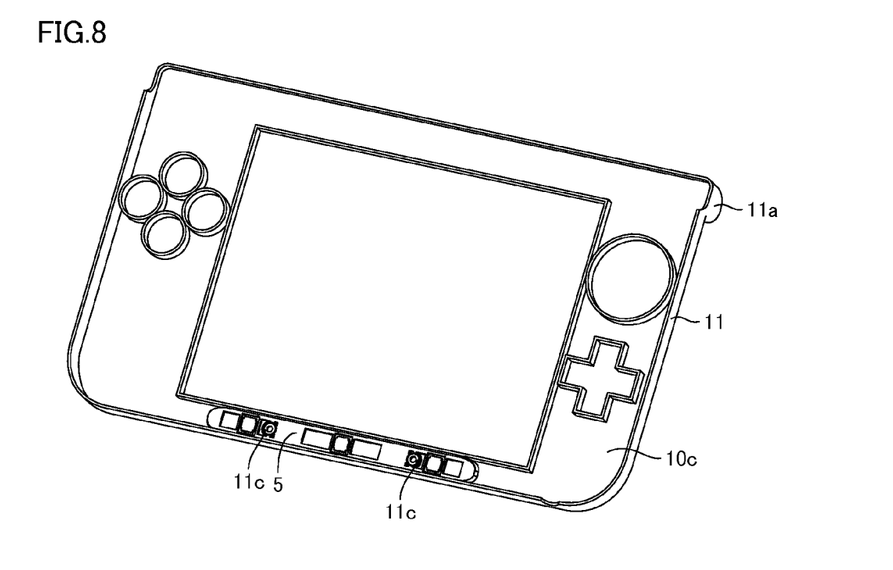
FIG. 8 shows an exemplary illustrative non-limiting schematic perspective view showing a state that key rubber (a biasing portion) is attached to a lower housing according to an exemplary embodiment.
Figure 9:
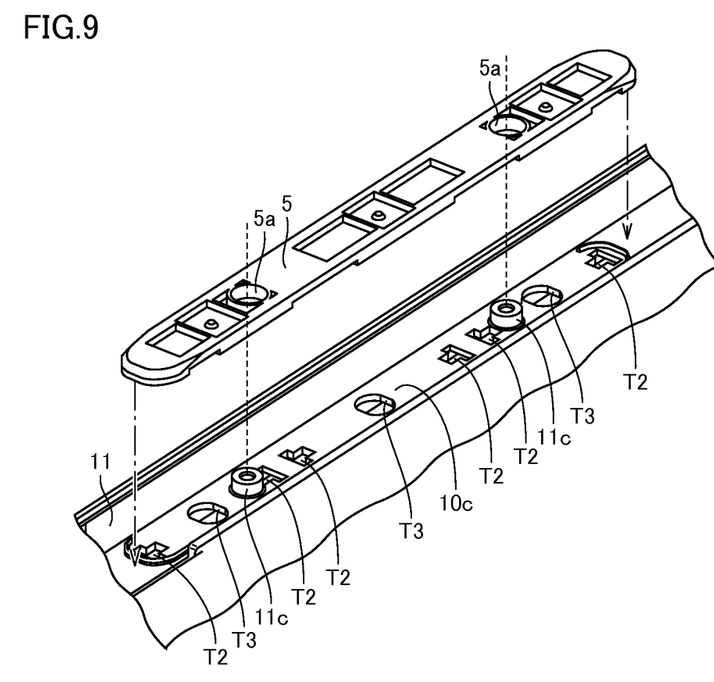
FIG. 9 shows an exemplary illustrative non-limiting schematic perspective view showing how the key rubber (biasing portion) is attached to the lower housing according to an exemplary embodiment.
Figure 10:
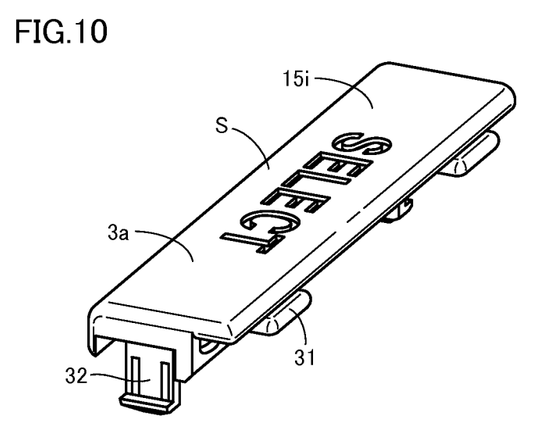
FIG. 10 shows an exemplary illustrative non-limiting schematic perspective view of a key top portion of the SELECT button when viewed from a side of a partial surface according to an exemplary embodiment.
Figure 11:
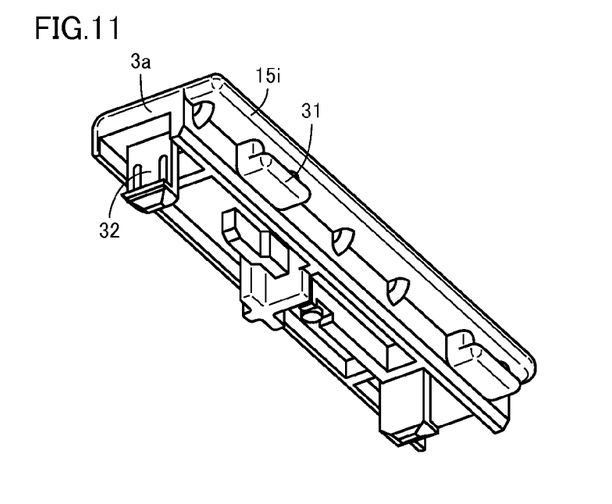
FIG. 11 shows an exemplary illustrative non-limiting schematic perspective view of the key top portion of the SELECT button when viewed from a side of a back surface according to an exemplary embodiment.
Figure 12:
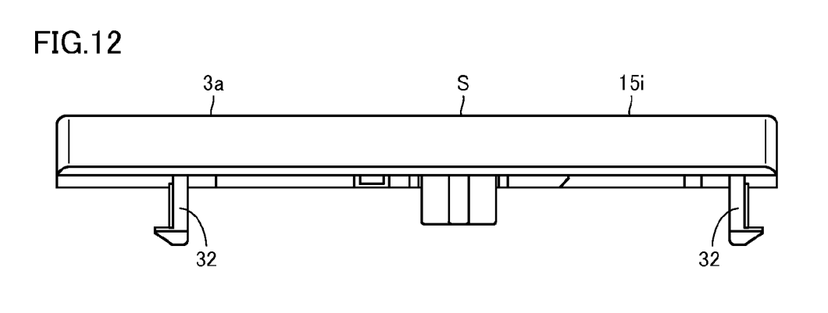
FIG. 12 shows an exemplary illustrative non-limiting schematic front view of the key top portion of the SELECT button according to an exemplary embodiment.
Figure 13:
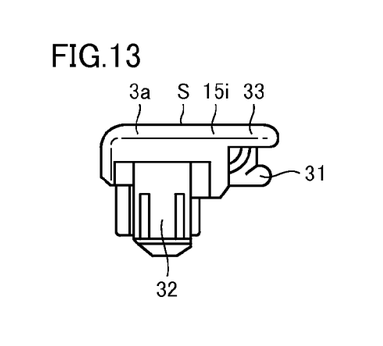
FIG. 13 shows an exemplary illustrative non-limiting schematic side view of the key top portion of the SELECT button according to an exemplary embodiment.
Figure 14:
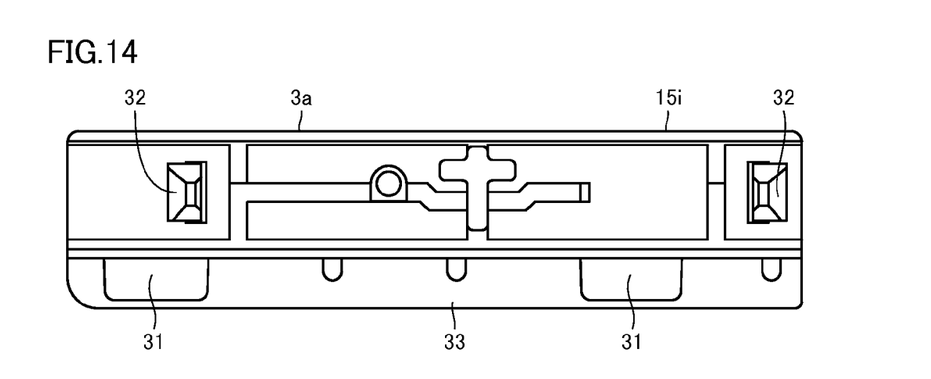
FIG. 14 shows an exemplary illustrative non-limiting schematic bottom view of the key top portion of the SELECT button according to an exemplary embodiment.

Referring to FIGS. 8 and 9, key rubber (biasing portion) 5 is arranged on a back surface 10c of lower front part 11. Key rubber (biasing portion) 5 is arranged at an end portion of lower front part 11 opposite to lower protrusion portion 11a. Key rubber (biasing portion) 5 has two engagement through holes 5a. A lower protrusion portion 11c formed on back surface 10c of lower front part 11 is inserted in each of two engagement through holes 5a. Key rubber (biasing portion) 5 is formed such that it can be pressed by each of key top portions 3a to 3c inserted through insertion hole T3.

A construction of key top portions 3a to 3c will be described in further detail with reference to FIGS. 10 to 14. Here, key top portion 3a of SELECT button 15i will be described. Partial surface S of each of key top portions 3a to 3c has a substantially rectangular shape.

Engagement portion 31 is formed at each of opposing end portions along a longitudinal direction, at the lower surface of key top portion 3a. Engagement portion 31 has a portion extending downward from the lower surface of key top portion 3a and a portion extending therefrom along a shorter side toward its one end. Namely, engagement portion 31 is bent. Falling-off prevention portion 32 is formed at each of the opposing end portions of the longitudinal direction, at the lower surface of key top portion 3a. Each falling-off prevention portion 32 has, at its tip end, a portion extending outward along the longitudinal direction of key top portion 3a.

Key top portion 3b of START button 15k is also similar in construction to key top portion 3a of SELECT button 15i. Though key top portion 3b of HOME button 15j is different in having one engagement portion 31 in a central portion of the longitudinal direction as shown in FIG. 7, it is otherwise similar in construction to key top portion 3a of SELECT button 15i.

An operation of the switch mechanism will now be described.

Figure 15:
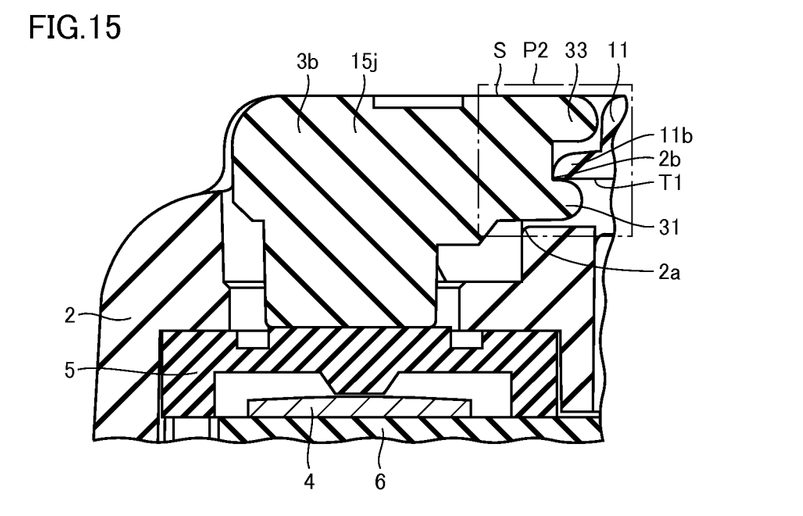
FIG. 15 shows an exemplary illustrative non-limiting schematic cross-sectional view showing a state before a partial surface of a key top portion of a switch mechanism is pressed according to an exemplary embodiment.
Figure 16:
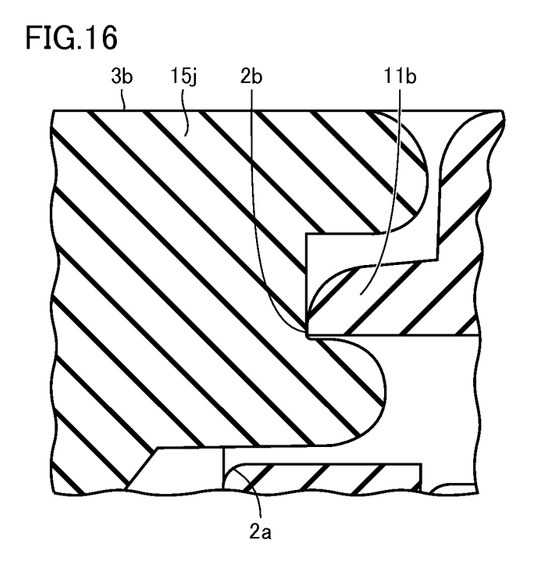
FIG. 16 shows an exemplary illustrative non-limiting enlarged view showing a P2 portion in FIG. 15 according to an exemplary embodiment.
Figure 17:
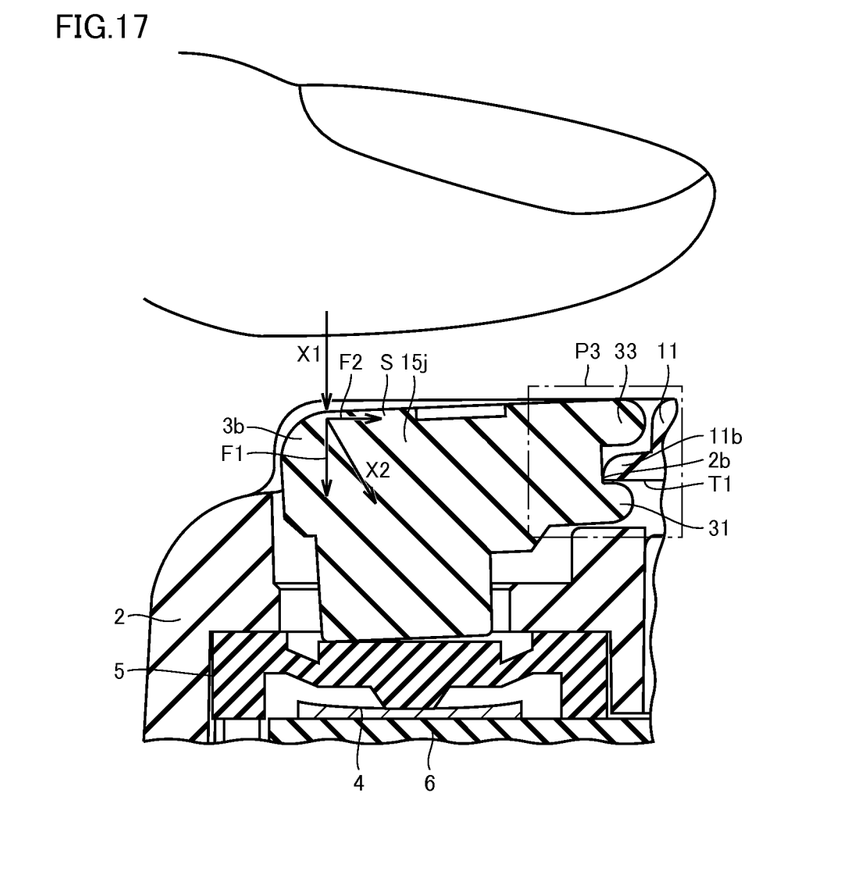
FIG. 17 shows an exemplary illustrative non-limiting schematic cross-sectional view showing a state that the key top portion is tilted as the partial surface of the key top portion of the switch mechanism is pressed according to an exemplary embodiment.
Figure 18:
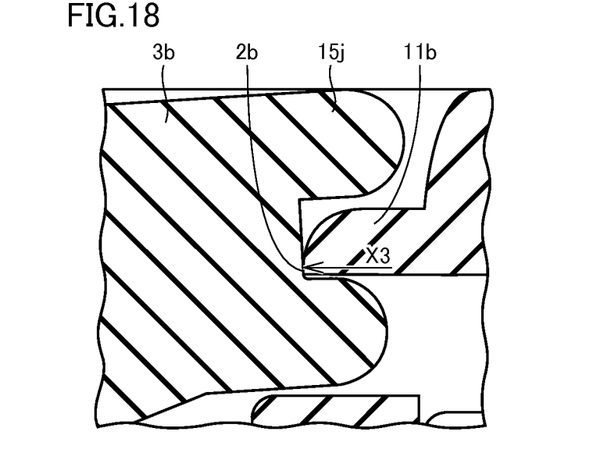
FIG. 18 shows an exemplary illustrative non-limiting enlarged view showing a P3 portion in FIG. 17 according to an exemplary embodiment.

Referring to FIGS. 15 and 16, before partial surface S of key top portion 3b of HOME button 15j is pressed, key top portion 3b is placed on key rubber (biasing portion) 5. Referring to FIGS. 17 and 18, when partial surface S of key top portion 3b of HOME button 15j is pressed with a finger 40 of an operator from this state, key top portion 3b is pressed in in a direction X1 of pressing.

Since key top portion 3b is pressed in an oblique direction X2 because it is provided at the peripheral portion of housing portion 2, not only force F1 pressing down vertically but also force F2 pressing to the right in the horizontal direction are applied to key top portion 3b. Though key top portion 3b attempts to move in a right direction owing to this force F2 in the right direction, movement thereof is restricted by restriction member 11b. Then, side support portion 2b supports key top portion 3b from the side. Namely, side support portion 2b supports key top portion 3b from a direction X3 intersecting direction X1 of pressing key top portion 3b. Then, key top portion 3b is pressed down, with side support portion 2b serving as a fulcrum. Thus, key top portion 3b is tilted. Accordingly, a seesaw structure is implemented as side support portion 2b supports key top portion 3b from the side. Then, switch portion 4 is pressed by a lower end of key top portion 3b, with key rubber (biasing portion) 5 being interposed.

Figure 19:
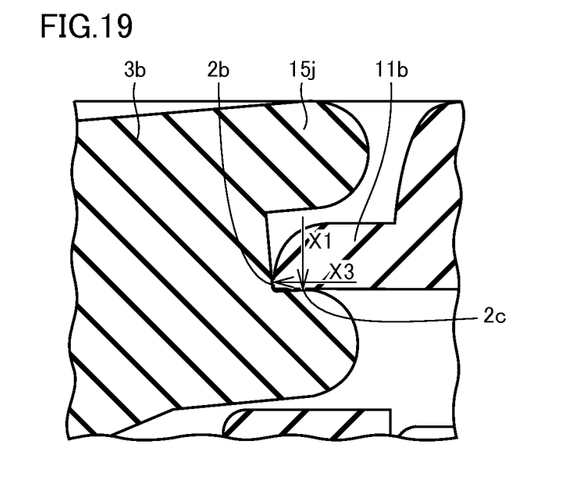
FIG. 19 shows an exemplary illustrative non-limiting schematic cross-sectional view showing a state that the key top portion is further tilted from the state shown in FIG. 18 according to an exemplary embodiment.

In succession, an operation at the time when partial surface S of key top portion 3b is further pressed will be described with reference to FIG. 19. In the state shown in FIG. 18, key top portion 3b is supported at points of contact with side support portion 2b and switch portion 4. When partial surface S of key top portion 3b is further pressed from the state shown in FIG. 18, key top portion 3b is inclined with side support portion 2b serving as the fulcrum, and key top portion 3b as a whole moves downward. As tilting of key top portion 3b thus proceeds, key top portion 3b comes in contact with contact portion 2c. Thus, key top portion 3b is supported by contact portion 2c in direction X1 of pressing key top portion 3b. Then, displacement of key top portion 3b in the direction opposite to direction X1 of pressing is restricted by contact portion 2c.

As tilting of key top portion 3b proceeds, key top portion 3b is tilted while being in contact with both of side support portion 2b and contact portion 2c. Here, key top portion 3b is tilted while both of a position where key top portion 3b and side support portion 2b are in contact with each other and a position where key top portion 3b and contact portion 2c are in contact with each other are varied. More specifically, key top portion 3b is tilted while a position where key top portion 3b and side support portion 2b are in contact with each other moves upward along the side surface of key top portion 3b and a position where key top portion 3b and contact portion 2c are in contact with each other moves to the right along the lower surface of restriction member 11b.

Figure 20:
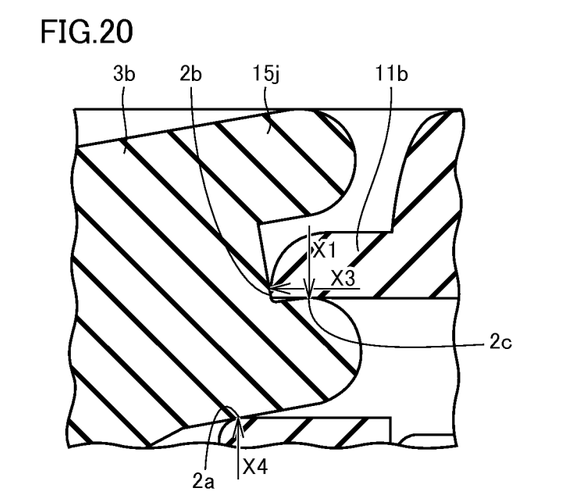
FIG. 20 shows an exemplary illustrative non-limiting schematic cross-sectional view showing a state that the key top portion is further tilted from the state shown in FIG. 19 according to an exemplary embodiment.

Thereafter, referring to FIG. 20, when key top portion 3b is further pressed in, key top portion 3b is further tilted. In this state, support portion 2a supports key top portion 3b from a direction X4 opposite to direction X1 of pressing key top portion 3b.

Though a case where key top portion 3a returns to a position before being pressed, owing to elastic force of key rubber (biasing portion) 5 has been described above, limitation thereto is not intended. The switch mechanism may be constructed such that key top portion 3a returns to a position before being pressed, owing to elastic force of key top portion 3b. Alternatively, the switch mechanism may be constructed such that key top portion 3a returns to a position before being pressed, owing to elastic force of switch portion 4.

Functions and effects of one or more exemplary embodiments described above will now be described.

The switch mechanism is applied to a button provided at the end of housing portion 2. When such a button is pressed, force in the horizontal direction is applied to the button without operator's particular intention. In the switch mechanism, when partial surface S of key top portion 3b is pressed, side support portion 2b supports key top portion 3b from the side. When partial surface S exposed at the peripheral portion of the housing portion is pressed, key top portion 3b is obliquely pressed, and hence force pressing key top portion 3b acts not only in direction X1 of pressing key top portion 3b but also on the side of key top portion 3b. Therefore, with support of key top portion 3b from the side by side support portion 2b, key top portion 3b can be tilted while it is supported by side support portion 2b. Therefore, a switch mechanism of which key top portion 3b can be tilted with a simple mechanism without using a pin can be implemented.

In addition, housing portion 2 is constructed such that key top portion 3b is tilted while a position where side support portion 2b and key top portion 3b are in contact with each other is varied when partial surface S of key top portion 3b is pressed. Therefore, when partial surface S of key top portion 3b is pressed, key top portion 3b can be tilted while a position where side support portion 2b and key top portion 3b are in contact with each other is varied. Thus, key top portion 3b can smoothly be tilted.

Moreover, housing portion 2 further includes contact portion 2c for supporting key top portion 3b from direction X1 of pressing key top portion 3b when partial surface S of key top portion 3b is pressed. Therefore, when partial surface S of key top portion 3b is pressed, contact portion 2c can support key top portion 3b from direction X1 of pressing key top portion 3b. Accordingly, displacement of the key top portion in direction X4 opposite to direction X1 of pressing can be suppressed by contact portion 2c. Thus, key top portion 3b can be tilted in a stable manner. Furthermore, housing portion 2 is constructed such that key top portion 3b is tilted while a position where contact portion 2c and key top portion 3b are in contact with each other is varied when partial surface S of key top portion 3b is pressed. Therefore, when partial surface S of key top portion 3b is pressed, key top portion 3b can be tilted while a position where contact portion 2c and key top portion 3b are in contact with each other is varied. Thus, key top portion 3b can smoothly be tilted.

In addition, housing portion 2 further includes support portion 2a for supporting key top portion 3b from direction X4 opposite to direction X1 of pressing key top portion 3b when partial surface S of key top portion 3b is pressed. Therefore, when partial surface S of key top portion 3b is pressed, key top portion 3b can be supported by support portion 2a from direction X4 opposite to direction X1 of pressing key top portion 3b. Thus, key top portion 3b can smoothly be tilted.

Moreover, key top portion 3b further includes engagement portion 31 formed to protrude sideward from key top portion 3b and cover portion 33 forming a part of partial surface S of key top portion 3b. Key top portion 3b is constructed to be supported by side support portion 2b between engagement portion 31 and cover portion 33. Therefore, since side support portion 2b lies between engagement portion 31 and cover portion 33, falling off of key top portion 3b from housing portion 2 can be suppressed. In addition, since cover portion 33 can cover side support portion 2b, exposure of side support portion 2b can be suppressed.

Furthermore, switch portion 4 is arranged to be pressed by key top portion 3b as key top portion 3b is tilted while it is supported by both of side support portion 2b and contact portion 2c when partial surface S of key top portion 3b is pressed. Thus, as key top portion 3b is tilted while it is supported by both of side support portion 2b and contact portion 2c, switch portion 4 can be pressed in.

In addition, key rubber (biasing portion) 5 which is arranged between key top portion 3b and switch portion 4 and capable of biasing key top portion 3b in direction X4 opposite to direction X1 of pressing is further provided. Key rubber (biasing portion) 5 can bias key top portion 3b in direction X4 opposite to direction X1 of pressing. Thus, key rubber (biasing portion) 5 can return key top portion 3b to a position before pressing.

Moreover, the switch mechanism further includes falling-off prevention portion 32 provided in key top portion 3b, and falling-off prevention portion 32 is locked to housing portion 2. Therefore, falling-off prevention portion 32 can prevent key top portion 3b from falling off from housing portion 2.

Game device 1 includes the switch mechanism described above. Thus, game device 1 including the switch mechanism of which key top portions 3a to 3c can be tilted with a simple mechanism can be obtained.

In addition, the switch mechanism is arranged in a part of the peripheral portion of housing portion 2. Therefore, at the peripheral portion of housing portion 2, key top portions 3a to 3c can be tilted outward of housing portion 2. Thus, operability of key top portions 3a to 3c can be improved.

Though a case where exemplary embodiments are applied to the START button, the HOME button, and the SELECT button has been described above, the exemplary embodiments can be applied, for example, also to the R button and the L button provided at the shoulder portions of the housing.

The switch mechanism is applicable to various electronic devices. For example, in addition to the game device above, a mobile phone, a PDA (Personal Digital Assistant), a personal computer, and the like are exemplified as the electronic devices. In addition, a controller for the game device is also included in the electronic devices.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A switch mechanism, comprising:
   a housing portion;
   a key top portion arranged such that a partial surface is exposed at a peripheral portion of said housing portion; and
   a switch portion which is arranged in inside of said housing portion and is pressed in response to pressing of the partial surface of said key top portion,
   said housing portion including a side support portion which forces said key top portion to tilt by supporting said key top portion from a side when said partial surface of said key top portion is pressed.

2. The switch mechanism according to claim 1, wherein said housing portion is constructed such that said key top portion is tilted while a position where said side support portion and said key top portion are in contact with each other is varied when said partial surface of said key top portion is pressed.

3. The switch mechanism according to claim 1, wherein said housing portion further includes a contact portion for supporting said key top portion from a direction of pressing said key top portion when said partial surface of said key top portion is pressed.

4. The switch mechanism according to claim 3, wherein said housing portion is constructed such that said key top portion is tilted while a position where said contact portion and said key top portion are in contact with each other is varied when said partial surface of said key top portion is pressed.

5. The switch mechanism according to claim 1, wherein said housing portion further includes a support portion for supporting said key top portion from a direction opposite to a direction of pressing said key top portion when said partial surface of said key top portion is pressed.

6. The switch mechanism according to claim 1, wherein said key top portion further includes an engagement portion formed to protrude sideward from said key top portion and a cover portion forming a part of said partial surface of said key top portion, and
said key top portion is constructed to be supported by said side support portion between said engagement portion and said cover portion.

7. The switch mechanism according to claim 3, wherein said switch portion is arranged to be pressed by said key top portion as said key top portion is tilted while said key top portion is supported by both of said side support portion and said contact portion when the partial surface of said key top portion is pressed.

8. The switch mechanism according to claim 1, further comprising a biasing portion which is arranged between said key top portion and said switch portion and capable of biasing said key top portion in a direction opposite to a direction of pressing said key top portion when said partial surface of said key top portion is pressed.

9. The switch mechanism according to claim 8, further comprising a falling-off prevention portion provided in said key top portion, wherein
said falling-off prevention portion is locked to said housing portion.

10. An electronic device, comprising a switch mechanism, said switch mechanism including
a housing portion,
a key top portion arranged such that a partial surface is exposed at a peripheral portion of said housing portion, and
a switch portion which is arranged in inside of said housing portion and is pressed in response to pressing of the partial surface of said key top portion,
said housing portion including a side support portion which forces said key top portion to tilt by supporting said key top portion from a side when said partial surface of said key top portion is pressed.

11. The electronic device according to claim 10, wherein said housing portion is constructed such that said key top portion is tilted while a position where said side support portion and said key top portion are in contact with each other is varied when said partial surface of said key top portion is pressed.

12. The electronic device according to claim 10, wherein said housing portion further includes a contact portion for supporting said key top portion from a direction of pressing said key top portion when said partial surface of said key top portion is pressed.

13. The electronic device according to claim 12, wherein said housing portion is constructed such that said key top portion is tilted while a position where said contact portion and said key top portion are in contact with each other is varied when said partial surface of said key top portion is pressed.

14. The electronic device according to claim 10, wherein said housing portion further includes a support portion for supporting said key top portion from a direction opposite to a direction of pressing said key top portion when said partial surface of said key top portion is pressed.

15. The electronic device according to claim 10, wherein said key top portion further includes an engagement portion formed to protrude sideward from said key top portion and a cover portion forming a part of said partial surface of said key top portion, and
said key top portion is constructed to be supported by said side support portion between said engagement portion and said cover portion.

16. The electronic device according to claim 12, wherein said switch portion is arranged to be pressed by said key top portion as said key top portion is tilted while said key top portion is supported by both of said side support portion and said contact portion when the partial surface of said key top portion is pressed.

17. The electronic device according to claim 10, further comprising a biasing portion which is arranged between said key top portion and said switch portion and capable of biasing said key top portion in a direction opposite to a direction of pressing said key top portion when said partial surface of said key top portion is pressed.

18. The electronic device according to claim 17, further comprising a falling-off prevention portion provided in said key top portion, wherein
said falling-off prevention portion is locked to said housing portion.

* * * * *